Figure 1:
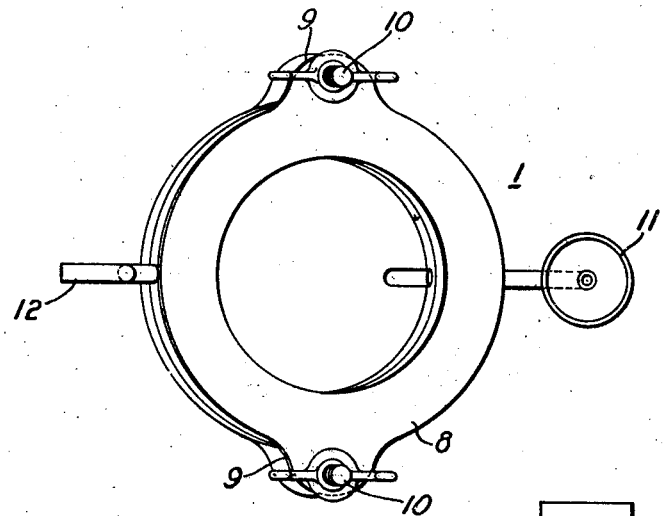

Nov. 10, 1925.  
F. A. SESLER  
1,561,285  
APPARATUS FOR TESTING THE RATE OF LIQUID ABSORPTION BY FABRICS OR THE LIKE  
Filed Jan. 20, 1920

WITNESSES:  
H. J. Shelhamer  
O. E. Bee.

INVENTOR  
Fred A. Sesler  
BY  
Wesley G. Carr  
ATTORNEY

Patented Nov. 10, 1925.

1,561,285

UNITED STATES PATENT OFFICE.

FRED A. SESLER, OF PROVIDENCE, RHODE ISLAND, ASSIGNOR TO WESTINGHOUSE ELECTRIC & MANUFACTURING COMPANY, A CORPORATION OF PENNSYLVANIA.

APPARATUS FOR TESTING THE RATE OF LIQUID ABSORPTION BY FABRICS OR THE LIKE.

Application filed January 20, 1920. Serial No. 352,895.

*To all whom it may concern:*

Be it known that I, FRED A. SESLER, a citizen of the United States, and a resident of Providence, in the county of Providence and State of Rhode Island, have invented a new and useful Improvement in Apparatus for Testing the Rate of Liquid Absorption by Fabrics or the like, of which the following is a specification.

My invention relates to testing devices and, more particularly, to testing devices suitable for determining the rate of liquid absorption by textile fabrics, paper, or the like. The primary object of my invention is to provide a simple device of the above described character which shall be dependable in operation.

In the manufacture of articles composed of fibrous material and a binder, the fibrous material, in most instances, is first impregnated and then dried, after which the article desired is formed of the treated material. The formed article is then usually subjected to heat and pressure to compact the material and to harden the binder, in case the binder is of such character as to harden under the application of heat. The process of impregnating and drying the fibrous material may be greatly facilitated if the rate of absorption of the binder by the fibrous material is known. In fact, the rate of absorption must be known in order to insure thorough impregnation of the fibrous material and, consequently, a homogeneous body when the article is formed of it.

One object of my invention is, therefore, to provide a device which may be employed in determining the rate of impregnation of various fibrous materials by various binders or liquids, and thus facilitate the manufacture of articles formed of such materials.

With these and other objects in view, my invention will be more fully described, illustrated in the drawings, in the several views of which corresponding numerals indicate like parts, and then particularly pointed out in the claims.

Figure 2:
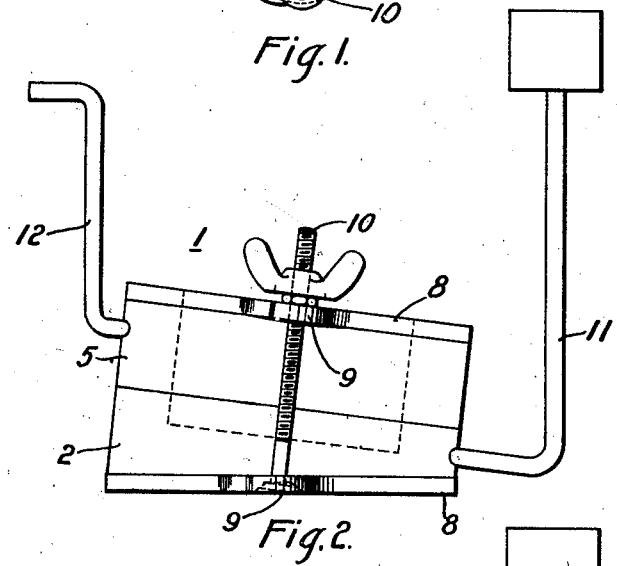
Figure 3:
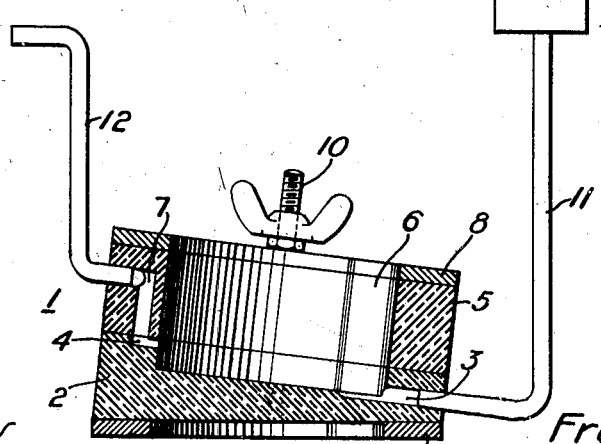

In the drawings, Fig. 1 is a plan view of a device constructed in accordance with my invention; Fig. 2 is a side elevational view of the device shown in Fig. 1, and Fig. 3 is a sectional view of the device shown in Fig. 1.

In practicing my invention, I may construct a testing device by forming a two-part receptacle provided with suitable openings to admit a liquid into the lower part of the receptacle and by providing means for clamping a test piece between the two parts of the body. I may also provide means for indicating when the lower part of the receptacle is filled with liquid or when the liquid comes into contact with the test piece and also for regulating the head of the liquid.

In the drawings is shown a two-part receptacle 1, comprising a lower part 2 which is preferably formed with a closed beveled end, the advantage of which will be pointed out later. The lower part 2 may also be provided with a plurality of openings 3 and 4. An upper part 5 is so formed as to snugly engage the upper face of the lower part 2 and, when placed in position, provides a testing chamber 6. The upper part 5 is provided with a suitable opening 7 adapted to register with the opening 4 in the part 2 and provides an outlet from the lower part of the chamber 6. A plurality of correspondingly formed plates 8 are adapted to fit upon the respective ends of the receptacle 1, and each is provided with ears 9 having openings adapted to receive clamping bolts 10. A funnel member 11 is adapted to fit within the openings 3 in the lower part 2, and a conduit 12 is adapted to fit into the opening 7 in the upper part 5.

In testing the rate of liquid absorption by fibrous sheet material, the testing device, above described, may be employed in the following manner. The test piece may be disposed between the upper and lower parts 2 and 5 and secured in place by means of the metal plates and clamping bolts. The liquid may be poured into the funnel member 11 and forced into the lower part of the chamber 6 below the test piece. As the liquid fills the space below the test piece, the air contained therein will be forced out through the openings 4 and 7 and the outlet conduit 12. When the liquid appears at the outer end of the outlet conduit 12, it is known that it engages the entire under surface of the test piece and the time period elapsing between its appearance at the outlet point and its penetration of the test piece is a measure of the rate of absorption.

The beveled lower part 2 provides an inclined surface which facilitates forcing air out of the lower part of the chamber below the test piece. The inclination of the chamber thus provided need be only slight, it being somewhat exaggerated in the drawings to clearly illustrate the principle. The outlet conduit 12 regulates the head of liquid by its position relative to the inlet member 11. When the conduit 12 is in a vertical position, the greatest head of liquid is, of course, provided, and this head may be reduced by properly turning the conduit to provide a lower level of liquid. This outlet, therefore, serves two purposes, to regulate the head of liquid, and to indicate the time of complete engagement of the liquid with the test piece.

It will be appreciated, from the above description, that the rate of absorption of the liquid by a fabric may be easily and quickly determined by a device constructed in accordance with my invention. The structure is easily assembled and the test may be accurately performed in a short time by any one, whether familiar with such tests or not. The material of which the device is constructed is governed, to a great extent, by the nature of the binders or liquids ordinarily tested. I have found that fibrous material impregnated with a phenolic condensation product may be advantageously employed in constructing my testing device. The material above mentioned is suitable for a wide variety of liquids, as it is unaffected by oils, weak acids and alkalis. The material employed, however, in constructing the device, may be varied as seems desirable and does not constitute a part of my invention.

Although I have specifically described a testing device constructed in accordance with my invention, it will be obvious that minor changes may be made in the construction without departing from the spirit thereof, and I desire, therefore, that no limitations shall be imposed except such as are indicated in the appended claims.

I claim as my invention:—

1. A device for testing the liquid absorption of fibrous sheet material comprising a substantially cylindrical receptacle having a beveled base and an opening in one end thereof, means for clamping fibrous sheet material across the opening of said receptacle, means for admitting fluid into the enclosed portion thereof and means for indicating the effective level of the liquid.

2. A device for testing the rate of liquid absorption by textile fabrics, paper, or the like comprising a ring provided with a passage from its periphery to an adjacent face, a cylindrical receptacle provided with a plurality of passages one of which is adapted to register with the passage in the ring, said receptacle having a closed, beveled end, means for clamping a test piece between the ring and the receptacle and means for indicating the rate of liquid absorption of the test piece.

3. A device for testing the rate of liquid absorption by textile fabrics, paper, or the like comprising a ring provided with a passage from its periphery to an adjacent face, a cylindrical receptacle provided with a plurality of passages one of which is adapted to register with the passage in the ring, said receptacle having a closed, beveled end, means for clamping a test piece between the ring and the receptacle and mean for regulating the head of a liquid admitted to the receptacle.

4. A device for testing the rate of liquid absorption by textile fabrics, paper, or the like comprising a ring provided with a passage from its periphery to an adjacent face, a cylindrical receptacle provided with a plurality of passages one of which is adapted to register with the passage in the ring, said receptacle having a closed, beveled end, means for clamping a test piece between the ring and the receptacle and means for indicating the amount of liquid absorbed by the test piece and also for regulating the head of the liquid.

5. A device for testing the rate of liquid absorption by textile fabrics, paper, or the like comprising a sectional body providing a chamber, means for clamping a test piece between the sections to form an inclined partition across the chamber said chamber having an outlet provided in its uppermost portion and means for filling the part of the chamber below the test piece.

6. A device for testing the rate of liquid absorption by paper, textile fabrics or the like comprising a body providing a chamber, means for securing a test piece at an angle to the horizontal to form a transverse partition across the chamber said chamber having an outlet provided in its uppermost portion and means for filling the chamber below the test piece and for indicating when it is filled.

In testimony whereof I have hereunto subscribed my name this ninth day of January, 1920.

FRED A. SESLER.